July 3, 1934.  W. H. BROOKS  1,965,365
METHOD OF DAMPPROOFING PLASTERING
Filed Nov. 28, 1932
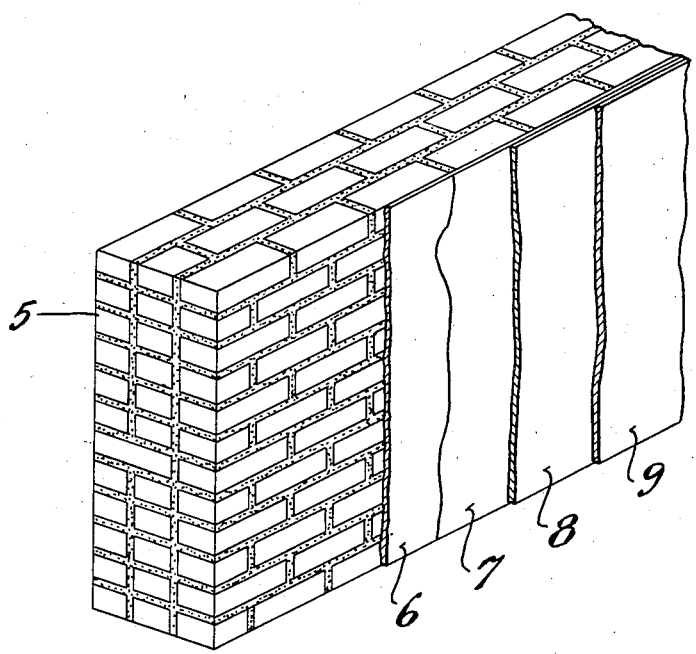
INVENTOR
W. H. Brooks
BY
ATTORNEYS Patented July 3, 1934

1,965,365

UNITED STATES PATENT OFFICE 1,965,365

METHOD OF DAMPPROOFING PLASTERING

William Hayden Brooks, Birmingham, Ala.

Application November 28, 1932, Serial No. 644,594

7 Claims. (Cl. 72—127)

My invention relates to a method for dampproofing plastering, and is more particularly, though not exclusively, concerned with the protection from injury by dampness of plastering applied directly to masonry or concrete walls.

Heretofore, the direct application of certain kinds of plastering materials to masonry wall has left such plastering liable to injury from water leaking or seeping through the masonry walls, for if water gains access to the same it results not only in breaking down or disintegrating the plaster but in causing a separation of the finishing coat and a destructive action thereon which will require the complete replacement of the plastering.

The building trade has long recognized the practical impossibility of preventing the seepage of water through masonry walls. The only method by which plastering on such walls has been made safe against attack from moisture has involved the interposition of a plaster support spaced from the masonry wall, this being generally accomplished by the use of furring strips to which metal lathing or other plaster support is applied in spaced relationship to the masonry walls, but such treatment involves an increase of cost which almost doubles the plastering cost. It has been attempted to prevent this seepage of water through masonry walls by the treatment of the latter with an internally applied dampproofing coating.

Such a damp-proofing coating, however, has not successfully protected the plastering applied thereon because the masonry wall presents an irregular and often deeply indented porous surface. When the coat of damp-proofing is applied to such surfaces it will not form a coating so free of voids or holes that external moisture cannot gain access therethrough to the plastering, and whenever a leak occurs at any point it is liable to run and attack plastering remote therefrom. Hence when a leaky condition once exists no practical means for correcting it and protecting the plastering has up to the present time been discovered except the expensive step of applying a water-proofing outer coating to the building wall and even this is not always a cure for the trouble.

I have discovered a simple method or process by which, without additional expense, a damp-proof plaster coating can be so applied that the finished plaster coat will be safe from attack by external moisture.

Briefly stated, my invention contemplates as its first step, applying in the ordinary manner directly on the masonary wall or other plaster support, a scratch coat of plastering material which is resistant to moisture so that it will not disintegrate or break down when attacked by moisture leaking through the wall. Certain types of plaster are now available on the market which will not dissolve when attacked by moisture and certain of which in fact have cementitious properties so that they will set or harden when exposed to moisture. In order that my invention may be practiced by those skilled in the art, suitable scratch coat plastering may be made up by substituting hydraulic lime plaster, or other plasters that will not disintegrate when exposed to moisture, for the ordinary gypsum plaster. Such other plasters include calcium or magnesium limes gauged with Keene's cement, a typical composition being one part lime and three parts sand to which Keene's cement is added in volume to 33% of the lime used. I have also obtained successful results by the use in the scratch coat of a lime now supplied to the market under the name of "Flamingo" by the Riverton Lime Company from its plant at Riverton, Virginia. While at the present time I prefer to use a hydraulic lime plaster for making up this water resistant scratch coat, nevertheless I understand that other lime or Portland cement plasters are available which have the property of not dissolving or breaking down under the attacks of moisture and any such plaster will be regarded as included within the term water resistant plasters as hereinafter used.

Having applied this scratch coat of moisture resistant plaster to the masonry wall and floated it to present a smooth, even and substantially unbroken surface with its voids filled, I next apply thereover a coat of damp-proofing which, having a smooth even surface to receive it, will be free of holes and will stop water penetrating beyond the scratch coat. Over this coat of damp-proofing I then apply a brown coat and finally the finishing coat. The brown coat may be of ordinary plaster or of water resistant plaster. When moisture gains access to the scratch coat through the masonry wall it will not injure it but if it attempts to pass on through the damp-proofing coat to attack the brown and finishing coats it will be stopped by the continuous, unbroken and imperforate sheet or coat of damp-proofing which will not permit any water to leak therethrough.

Standard plastering specifications require first the coat of damp-proofing and then the scratch, brown and finishing coats in that order. Therefore, the only changes incident to the practice of my process are the substitution of the special type of water resistant plastering materials in the scratch and/or brown coat, and the transfer of the damp-proofing coat to position between the scratch and brown coats. As hydraulic lime or other water resistant limes are not more expensive than the gypsum materials heretofore used, but are often less expensive, I am enabled to produce my damp-proofing plastering without added expense for either labor or materials.

My invention is peculiarly adapted to office buildings and commercial and industrial structures where masonry walls are employed and the expense of furring and offsetting the plaster supporting material is not practical.

My invention will be more particularly understood by reference to the accompanying drawing which illustrates the method of its application in a perspective view.

In the drawing a typical masonry wall is indicated at 5 and to its inner surface is applied the scratch coat 6 of ordinary thickness, differing only from the scratch coats as now commonly applied in that the plastering material utilized is of a water resistant nature so that it will not disintegrate under moisture, but will on the contrary in its preferred form tend to set and harden.

Having applied this scratch coat 6 it is floated to a true even surface free of voids, and allowed to set after which a coat 7 of damp-proofing is applied so as to provide an impervious film or coating. This coating may be made of the customarily used damp-proofing materials which usually have an asphaltic base cut to make it sufficiently liquid to be brushed or sprayed on to the receiving surface. This water-proofing or damp-proofing material is applied in such manner and in such thickness as to produce a non-porous imperforate coat over the scratch coat such that any water that may pass through the masonry wall and gain access to the scratch coat cannot reach and attack the brown coat 8 which is applied in the usual manner to this damp-proofing coat 7 and floated to a surface for receiving the finishing coat 9. It will be understood that the scratch coat in my method need not be scratched but is preferably floated to a smooth surface as such requires less damp-proofing material to insure against water leakage therethrough.

When the plastering has been thus applied it has only the ordinary thickness, no added labor or increased cost of material exists and yet the water tight damp-proofing coat between the water resistant scratch coat and the brown coat will present an impervious barrier through which any water leaking through the masonry wall and penetrating the scratch coat can be kept from attacking the brown and finishing coats and thus the latter are preserved in a damp-proof condition and no special treatment of the masonry walls will be needed to insure against plaster damage from the leakage of water therethrough.

It is to be understood that the damp-proofing coat shall be of such character that both the scratch and brown coats will bond to it.

It is further to be understood that when I refer to the use of brown and finishing coats, I intend such expression to include a single coat where such is specified, my invention not being concerned particularly with the character or application of the plastering that follows the coat of damp-proofing.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. A damp-proofing wall plastering, comprising a scratch coat of water resistant character for application to the wall surfaces to be plastered, a coat of damp-proofing applied over the scratch coat so as to provide an impervious barrier to the passage of water therethrough, a brown coat applied to the damp-proofing coat, and a finishing coat.

2. A damp-proofed plastered wall, comprising a masonry wall, a scratch coat of water resistant plastering applied to said wall, a water tight coat of damp-proofing completely covering said scratch coat, and plaster coats applied over the coat of damp-proofing.

3. A method of producing damp-proofing plastering, which consists in first applying to the surface to be plastered a scratch coat of water resistant plaster and allowing it to set, applying a leak-proof coat of damp-proofing over the scratch coat, applying a brown coat over the damp-proofing coat, and applying a finishing coat to the brown coat.

4. A method of plastering wall surfaces utilizing scratch, brown and finishing coats and a coat of damp-proofing, which consists in utilizing plastering materials which will not dissolve when exposed to moisture to make up the scratch coat, applying the scratch coat first to the wall surface, then applying a coat of damp-proofing between the scratch and brown coats.

5. The method of plastering a masonry wall which comprises first applying to the wall a scratch coat, then a coat of damp-proofing, then a brown coat, and finally a finishing coat, the scratch coat being made up with a plastering material which will not dissolve when exposed to water that may leak through the masonry wall, and the damp-proofing coat being of a character that will bond to the scratch and brown coats.

6. The method of plastering a masonry wall, which consists in applying to the wall a scratch coat comprising a hydraulic lime which is water resistant, floating its surface and allowing it to set, covering said scratch coat with an imperforate coat of damp-proofing, then applying a brown coat, and finally applying a finishing coat over the brown coat.

7. The method of plastering, which consists in applying to the plaster receiving surface a scratch coat of a water resistant nature, covering this scratch coat with an imperforate coat of damp-proofing that will bond thereto, and applying one or more plaster coats required over the damp-proofing coat.

WILLIAM HAYDEN BROOKS.